United States Patent
Voudouris (10) Patent No.: US 6,516,052 B2
(45) Date of Patent: Feb. 4, 2003

(54) METHOD OF SCHEDULING CONNECTIONS (75) Inventor: Christos Voudouris, Suffolk (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/125,380

(22) PCT Filed: Jun. 23, 1998

(86) PCT No.: PCT/GB98/01830

§ 371 (c)(1),
(2), (4) Date: Aug. 17, 1998

(87) PCT Pub. No.: WO99/01974

PCT Pub. Date: Jan. 14, 1999

(65) Prior Publication Data

US 2002/0106063 A1 Aug. 8, 2002

(30) Foreign Application Priority Data

Jul. 4, 1997 (GB) .............................. 9714227

(51) Int. Cl.[7] .............................................. H04M 1/24
(52) U.S. Cl. ..................................... 379/13; 379/114.04
(58) Field of Search .......................... 379/13, 112, 113, 379/115, 201, 133, 134, 114, 111, 137, 34, 114.04, 114.03, 1.01, 10.01, 10.02, 29.08, 29.09, 29.1, 32.01, 29.02, 112.01, 112.06

(56) References Cited

U.S. PATENT DOCUMENTS

| 5,369,680 A | * | 11/1994 | Borbas et al. ................ 379/13 |
| 5,539,802 A | * | 7/1996 | De Caluwe et al. .......... 379/13 |
| 5,729,588 A | * | 3/1998 | Chin et al. .................... 379/13 |
| 5,734,696 A | * | 3/1998 | Day ............................... 379/13 |
| 5,815,566 A | * | 9/1998 | Ramot et al. ............... 379/265 |
| 5,898,768 A | * | 4/1999 | Beyda et al. ............... 379/114 |
| 5,901,209 A | * | 5/1999 | Tannenbaum et al. ...... 379/142 |

* cited by examiner

Primary Examiner—Rexford Barnie
(74) Attorney, Agent, or Firm—Nixon & Vanderhye P.C.

(57) ABSTRACT

Call pattern data is generated for scheduling calls between a number of sites connected to a communication network. The call pattern data defines instructions for a number of sites to make a number of connections across the network to other sites over a predetermined period. This is achieved by creating a list of calls to be scheduled and then assigning in turn each of the calls to a source and a destination site. The source site and destination site are selected to satisfy one or a number of call constraint criteria associated with each call. The call pattern data representing the call is then generated and stored on a computer storage medium for subsequent download to the sites.

31 Claims, 7 Drawing Sheets

METHOD OF SCHEDULING CONNECTIONS

BACKGROUND OF THE INVENTION

1. Field of the Invention

The present invention relates to apparatus and a method for generating call pattern data for scheduling connections between a number of sites connected to a communication network. The connections will include voice type telephone calls as well as machine-to-machine calls and voice-to-machine calls, all of which will be referred to throughout the remainder of the description using the term "calls".

2. Related Art

In networking operations it is often desirable to simulate the day to day running of the network to allow the network operators to check that the network is functioning correctly. One example of where this is particularly important is in the case of public switched telephone networks (PSTN) in which it is desirable to generate a series of calls between different sites on the network to enable the network operator to check the billing procedure of the network. By having a prior knowledge of the calls that are made, the operator can compare the charges the system assigns to each site with the theoretical charge that should be made.

Currently the only method of generating such calls is to assign individual calls on a call by call basis to individual stations. However this does not simulate the normal running of the PSTN for three main reasons. Firstly, the network will generally be functioning under a far higher call load than the operator is able to generate. Secondly, calls over a network will normally occur in a random sequence which it is impossible for the operator to simulate. Thirdly, the calls will usually be spread out between numerous stations on the network and not between the few stations that the operator is able to assign calls to.

SUMMARY OF THE INVENTION

According to a first aspect of the present invention, we provide a method of generating call pattern data for scheduling calls between a number of sites connected to a communication network, where the call pattern data defines instructions for a number of sites to make a number of connections across the network to other sites over a predetermined period, comprising the steps of creating a list of calls to be scheduled, assigning in turn each of the calls to a source site selected from a list of sites and selecting a destination site for each call from the list of sites, the source site and destination site being selected to satisfy a number of call constraint criteria associated with each call, generating and storing the call pattern data on a computer storage medium for subsequent download.

According to a second aspect of the invention, we provide apparatus for generating call pattern data for scheduling calls between a number of sites connected to a first communications network, where the call pattern data defines instructions for a number of sites to make a number of connections across the first communications network to other sites over a predetermined period, the apparatus comprising a sequencer for creating a list of calls to be scheduled, wherein the sequencer comprises a storage medium for storing data defining a list of sites connected to the first communications network, a processor for assigning in turn each of the calls on the list to a source site selected from the list of sites and selecting a destination site for each call from the list of sites, the source site and destination site being selected to satisfy a number of call constraint criteria associated with each call, and an input device for inputting data defining the call constraint criteria into the storage medium, and wherein the call pattern data generated by the processor is stored on the storage medium.

The present invention provides both a method and apparatus for generating call pattern data for scheduling calls between a number of sites connected to a communication network. The calls scheduled according to the call pattern data must satisfy a number of call constraint criteria that may be determined by the operator of the system. This allows the operator to specify the nature of the calls that are made without having to specify details of the calls on an individual basis. As a result the operator can quickly and easily generate data that can be used to control calls over a network to simulate the day to day operation of a network. By allowing the operator to set the call levels conditions of normal load, underload or overload may be simulated.

Typically the call constraint criteria includes an indication of the total number of calls to be made during the predetermined period although this may be preset.

Preferably the call constraint criteria includes an indication of the type of call to be made, the types of call including simple chargeable and simple non-chargeable, although any type of suitable call such as a freephone call, BT charge card call, mobile phone call or phone conference call may be included.

Whilst the communications network may be a single contiguous network, preferably the communications network is divided into a number of zones with the sites being distributed between different zones and the call constraint criteria including an indication of the zone from which the calls are to be made. In such a case information concerning which zones the sites may be located in, so as to be suitable for receiving the defined calls, is also provided. This will depend upon the charge band under which the call up to be made i.e. local, regional or national.

Preferably the call constraint criteria also indicates the rate at which calls are to be charged, although this could be left undetermined. This will usually depend on factors such as the time of day at which the calls are made and the destination of the call.

Typically the call constraint criteria further includes the requirement that the variation in the utilisation of each site over the predetermined period is minimised. This is preferable as it results in an even spread in usage over all the sites on the network. However, it could be foreseen that in some circumstances an uneven distribution of usage may be advantageous in modelling the operation of a real network.

Typically the sequencer has a display, for displaying the call constraint criteria stored in the storage medium.

Preferably the apparatus also has a secondary storage means connected to a second network, with the sequencer connected to the second network so it can download the call pattern data to the secondary storage medium over the second network. This prevents the storage medium of the sequencer become overloaded.

According to a third aspect of the invention, we provide a method of generating calls between a number of sites of a communications network to simulate the day to day running of the network, the method comprising generating call pattern data according to the first aspect of the invention, downloading the call pattern data to the number of sites and causing each to respond to the call pattern data to make the calls defined therein.

According to a fourth aspect of the invention, we provide a method of verifying a call charging system of a communications network, the method comprising generating calls between a number of sites of the communications network according to the third aspect of the invention, generating a theoretical charge for the calls, defined for each site, from the call pattern data and comparing the charges assigned to each site by the call charging system to the theoretical charge generated for each site.

According to a fifth aspect of the present invention, we provide apparatus for generating calls between a number of sites of a communications network to simulate the day to day running of the network, the apparatus comprising apparatus according to the second aspect of the invention for generating call pattern data, the apparatus further comprising a controller connected to the second network and to the first network, wherein the controller comprises a controller storage medium and a controller processor, the controller processor being adapted to download the call pattern data, from the secondary storage medium, over the second network, to the controller storage medium and then download the call pattern data from the controller storage medium, over the first network, to the number of sites and wherein the number of sites respond to the call pattern data to make the calls defined therein.

According to a sixth aspect of the present invention, we provide apparatus for verifying a call charging system of a communications network, the apparatus comprising apparatus according to the fifth aspect of the invention for generating calls between a number of sites of the first communications network, a call charging system connected to the first network for assigning a charge to the calls made by each site, and calculation means for downloading results data generated by each site and stored in the controller storage medium, generating a theoretical charge for the calls for each site in accordance with the results data, downloading the charges assigned to each site from the call charging system and comparing the charges assigned to each site with the theoretical charge generated for each site.

These methods and sets of apparatus allow network operators to simulate the day to day operation of a network and consequently check the call charging systems that the network utilises to bill the various sites. It will be apparent to a person skilled in the art that the system will also be useful for testing the integrity and operation of the network under conditions of varying load.

Preferably the communications network is a public switched telephone network, although it will be realised that any network over which sites are able to communicate would be suitable for use with the apparatus and method of the present invention.

BRIEF DESCRIPTION OF THE DRAWINGS

An example of a call charge verification system will now be described with reference to the accompanying drawings in which.

DETAILED DESCRIPTION OF EXEMPLARY EMBODIMENTS

Figure 1:
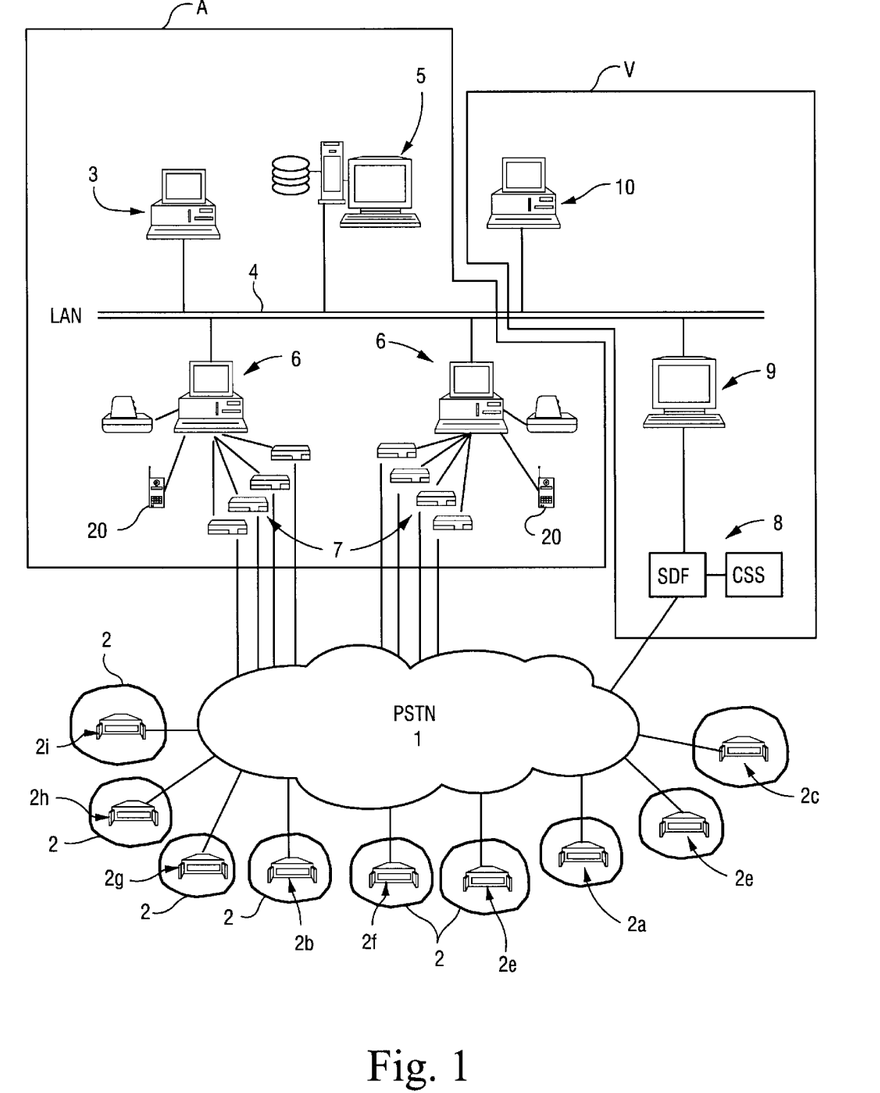
FIG. 1 shows a schematic representation of an example of call charge verification system utilizing call scheduling apparatus according to the present invention.

An example of a call charge verification system for a public switched telephone network (PSTN) 1 is shown in FIG. 1. The system comprises call scheduling apparatus A and call charge verification apparatus V connected to the PSTN 1. Also connected to the PSTN 1 are a number of sites 2 each site having a remote terminal 2a, 2b, 2c, 2d, 2e, 2f, 2g, 2h, 2i connected to the PSTN 1. Each remote terminal 2a, 2b, 2c, 2d, 2e, 2f, 2g, 2h, 2i, which generally comprises a personal computer or the like connected to the network 1 via a modem, is designed to transmit and/or receive calls made over the PSTN 1 to or from the remote terminals 2a, 2b, 2c, 2d, 2e, 2f, 2g, 2h, 2i of other sites 2.

The remote terminals 2a, 2b, 2c, 2d, 2e, 2f, 2g, 2h, 2i are capable of operating in one of three modes of operation such that, for example, remote terminals 2a, 2b, 2c can both transmit and receive calls, remote terminals 2d, 2e, 2f can only receive calls, whilst remote terminals 2g, 2h, 2i, can only transmit outgoing calls. This allows calls to be made from sites 2 with remote terminals 2a, 2b, 2c, 2g, 2h, 2i, to other sites 2 with remote terminals 2a, 2b, 2c, 2d, 2e, 2f, over the PSTN 1. Typically there are upwards of 750 remote terminals located at over 750 different sites 2.

The call scheduling apparatus A includes a personal computer, or Unix workstation or the like 3 operating a sequencer algorithm (hereinafter referred to as the sequencer 3) connected over a local area network 4 (hereinafter referred to as the LAN 4) to a file server 5 and one or more master controllers 6. The LAN 4 is also connected to a comparator 9 and a monolog controller 10 of the call verification apparatus V. The arrangement of the sequencer 3, file server 5 and one of the master controllers 6 is shown in more detail in FIG. 2.

Figure 2:
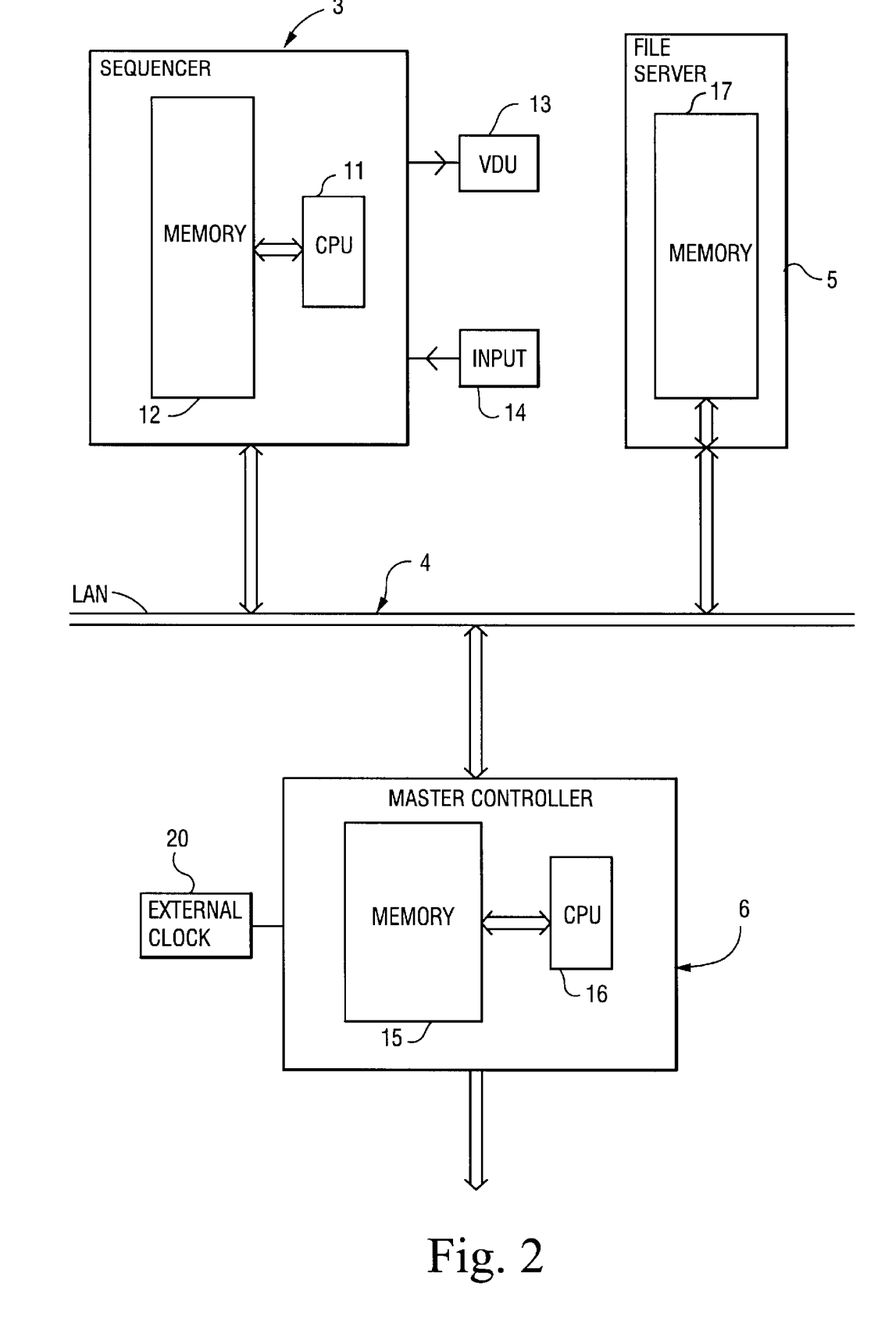
FIG. 2 shows in more detail the arrangement of the sequencer, the file server and one of the master controllers of FIG. 1.

In this example, the sequencer 3 comprises a personal computer having a CPU 11, a memory 12, an associated VDU 13 and an input device 14, such as a mouse, keyboard or the like. The memory 12 stores a computer program (in C++) which implements a fast heuristic algorithm which allows an operator to generate a set of instructions for controlling the operation of the remote terminals 2a, 2b, 2c, 2d, 2e, 2f, 2g, 2h, 2i.

The file server 5 is a personal computer that includes a memory 17 which may be accessed directly by any other personal computer connected to the LAN 4 and this is used for temporary storage of the set of instructions generated by the sequencer 3.

Each master controller 6 is a personal computer with a CPU 16 connected to a memory 15 and an external clock 20. The CPU 16 runs a controlling program which operates to download the set of instructions from the file server 5 for temporary storage in the memory 15, prior to transfer to the remote terminals 2a, 2b, 2c, 2d, 2e, 2f, 2g, 2h, 2i via an array of modems 7 over the PSTN 1. In general, two master controllers 6 are used, with each controller 6 handling sets of instructions for half the sites 2. The transfer of the sets of instructions will be described in more detail below.

Also connected to the PSTN 1 is an SDP-CSS system 8 of the call charge verification apparatus V. The SDP-CSS system 8 is used for determining the call charges incurred by each site 2. The SDP-CSS system 8 monitors the time and duration of each call made by each site and uses this to calculate the total call charge incurred by each site 2 over a given period of time. This is the standard procedure that is used to calculate telephone bills by the major telecommunications networks.

The apparatus for scheduling calls A is designed to generate calls over the PSTN 1 that simulate the day to day operation of the PSTN 1 (this may also include the simulation of abnormal high/low load conditions as desired by the operator). By using this in conjunction with call verification apparatus this allows the call charging system that the PSTN 1 operates to be checked. Alternatively, the call charge verification apparatus may be replaced by other verification apparatus such as call quality verification apparatus which would allow the quality of calls made to be checked. However, for simplicity, the description will concentrate on the call charge verification mode of operation.

Under normal conditions, the PSTN 1 has to determine charges, using the SDP-CSS system 8, for calls that are occurring in a random sequence. Thus, the call charge verification system simulates this situation by generating a series of random calls across the PSTN 1 using the call scheduling apparatus A. By maintaining a record of the calls that are made and the rate that the calls should be charged at, the PSTN operator is able to calculate the theoretical cost of making the calls generated by the call scheduling apparatus A. By comparing this theoretical cost with the cost calculated by the SDP-CSS system, the network operator can check that the call charging system is functioning correctly under conditions of varying load.

Obviously, as mentioned above, by replacing the call charge verification apparatus V, other factors such as call quality, call connection success, call connection duration may be measured.

Operation of the call scheduling apparatus A to generate a sequence of calls will now be described. Firstly the operator of the system must define, in general terms, the calls that are to be made. This is done by entering call pattern definitions into the sequencer 3 using the input device 14. The call pattern definitions define the calls only in general terms relating to the day of the week, the call type, the zone the call is to be made from (of which there are ten in the United Kingdom), the charge band, i.e, local, regional or national, the tariff rate, i.e. day, night or weekend, and the number of calls of that type to be scheduled.

The call pattern definitions, along with information about the sites 2 and the system as a whole, define a set of constraints that must be satisfied before the calls that are to be made can be scheduled correctly. The scheduling of calls within the boundaries of these constraints is known as a constraint satisfaction problem.

Information concerning the constraints of the system itself are contained within the program itself. This includes details of times when the system is shut down for maintenance or other reasons, along with information about the systems addresses and memory locations.

Information about the nature of the remote terminals 2a, 2b, 2c, 2d, 2e, 2f, 2g, 2h, 2i themselves is contained within a sites file. This information includes an indication as to what mode the terminal is capable of operating in i.e. receive only, transmit only or two way communication, and times during which the terminals 2a, 2b, 2c, 2d, 2e, 2f, 2g, 2h, 2i are unavailable for communication. The sites file, which is shown in Table 1 and will be described in more detail below, is stored in memory 12.

Further information concerning possible destination sites 2, for calls made from terminals capable of transmitting calls i.e. transmit only or two-way terminals, is stored in a destinations file in memory 12. The destinations file lists for each remote terminal 2a, 2b, 2c, 2g, 2k, 2i that is capable of transmitting a call, all the remote terminals 2a, 2b, 2c, 2d, 2e, 2f that may receive the call for the particular charge band the call is made under. This information along with the system constraint information and information contained in the sites file, further constrains the assignment of calls to the different remote terminals.

The sequencer 3 translates the call pattern definitions into a list of calls to be scheduled and then schedules the calls by solving the constraint satisfaction problem to allocate the list of calls to the different sites 2. A separate set of instructions is then generated for each remote terminal of each site 2. These instructions, which are saved in the form of call pattern files, indicate when a call is to be made, the intended duration of the call and which remote terminals the call is to be made from and to. The calls are made over the course of a day such that a distribution of calls simulating the operation of a real network is obtained.

As mentioned above, the set of instructions, in the form of call pattern files, are transferred to the file server 5 for temporary storage in memory 17. There are separate call pattern files for each site 2 and these are stored in memory 17 in a call pattern directory. Within the call pattern directory there are seven sub-directories, one for each day of the week (Sunday is day one, Saturday is day seven).

From the file server 5, the call pattern files are transferred on a daily basis, over the LAN 4, to the memory 15 of one of the master controllers 6. From here, the master controller 6 downloads, at a predetermined time each day, the call pattern files for each site 2 to the respective site 2. This is done via the arrays of modems 7 connected to the PSTN 1 and is controlled by a CPU 16 which is coupled to an external real time clock 20 which is used to synchronise the timing of the download. Each remote terminal 2a, 2b, 2c, 2d, 2e, 2f, 2g, 2h, 2i responds to the respective call pattern file to make the calls specified by the sequencer 3.

The calls made are monitored by the SDP-CSS system 8 of the call verification apparatus V, which then calculates the total cost of calls made by the remote terminals of the sites 2. This calculated charge is then downloaded to the comparator 9 and compared to a theoretical charge which is determined from the results of the calls that were actually made.

The results, which confirm which calls actually occurred, are transferred daily from each site 2 to one of the master controllers 6, in the form of log files. This generally occurs at the predetermined upload time when the call pattern files defining the next set of calls to be made are transferred from the master controllers 6 to each site 2.

The results contained in the log files are transferred to the comparator 9 which uses this information to determine the theoretical charge which should be made for each site 2. These theoretical charges are then compared to the calculated charges to determine any discrepancies in the billing system.

In addition to this, double-checking is performed by the monolog controller 10, which logs all the calls made and can therefore be used to determine the theoretical cost of each call. This cost can then be compared to any billed call charges to further check the billing system.

In an alternative example, the actual calculated charge may be compared to a theoretical charge which is derived on the basis of the sets of instructions stored in the call pattern files and information about the tariff rates of the PSTN 1, which is stored in the memory 12 of the sequencer 3 in the form of tariff rate files. The tariff rate files show the tariff rate in force for any particular time period along with an indication of the duration of the test calls to be made for each charge band. A separate tariff rate file is provided for each day of the week.

In this case the call pattern files and the tariff rate files are downloaded to the monolog controller 10 over the LAN 4 from the memory 12. The monolog controller 10 then calculates the theoretical cost of each the calls which are defined by the call pattern files, in accordance with the tariff charges in the tariff rate files. These theoretical costs for each site 2 are then downloaded to the comparator 9, over the LAN 4.

The comparator 9 then compares the calculated charges determined by the SDP-CSS system 8 with the theoretical charges downloaded from the monolog controller 10.

In any event, either of the above methods allow a network regulator to verify that the charging system used by the operator of the PSTN 1 functions correctly and, if not, identify any problem.

The method of operation of the system will now be described in more detail.

Figure 3:
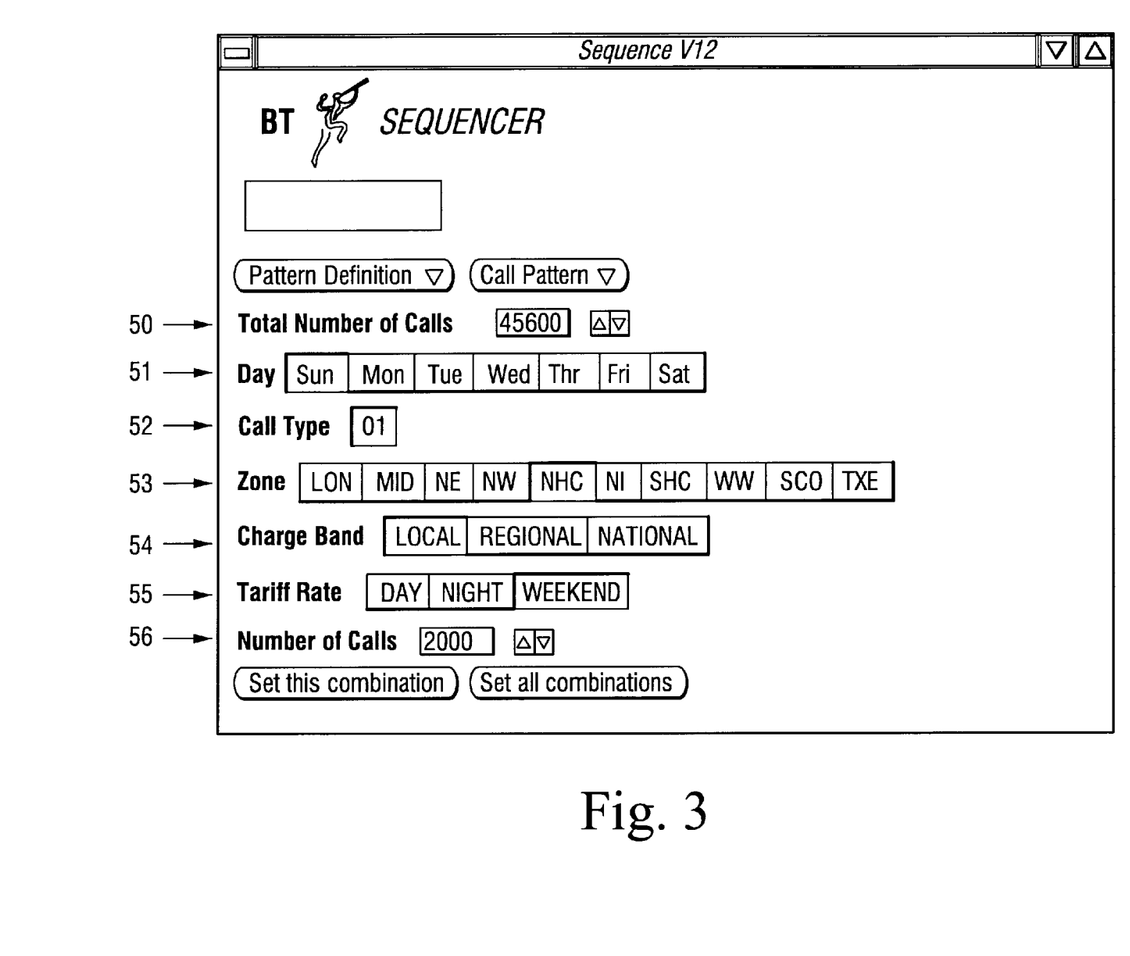
FIG. 3 shows an example of a graphical user-interface which may be used in conjunction with the sequencer of FIG. 1; and, FIGS. 4a to 4d form a flow diagram showing the steps the sequencer goes through to schedule the calls.

As mentioned above, the first stage of the procedure is for an operator to enter call pattern definitions which are used to define the calls that are scheduled. A graphical user-interface (hereinafter referred to as the GUI) is provided to facilitate the input of the call pattern definitions. An example of a GUI suitable for use with the sequencer of the present invention is shown in FIG. 3. In this case the GUI which is displayed on the VDU 13 as shown in FIG. 3, has six adjustable fields, with each field allowing a separate call pattern definition to be altered.

The day field 51 allows the operator to select on which day the defined calls are to be made. Thus, in the example shown, the sequencer will schedule a list of calls to be made on a Sunday. In general, it is preferable for the operator to allocate calls for an entire week at the same time, for reasons that will be explained below. This is done by setting the call pattern definitions for each day of an entire week at a single time. The sequencer 3 then generates and schedules calls for each day of the entire week, completing all the calls for the week in a single operation.

The call type field 52 allows the operator to define the type of calls that are to be scheduled for that day. In a simple system, for example, there may only be two call types; such as:

Type 01 which defines a simple call chargeable; and,

Type 02 which defines a simple call non-chargeable to Busy Tone.

However, in this example, there are provided 9 different call types, as shown below:

Type 1 (Ordinary calls)

PSTN or ISDN originated calls to sites which will answer the call. These calls will require a 25 second connect time overhead.

Type 2 (Provocative Ordinary calls)

PSTN or ISDN originated calls to sites which will be engaged on an already connected call. These calls will require a 25 second connect time overhead.

Type 3 (Multi-use Cashless calls)

PSTN or ISDN originated calls to sites which will answer the call. These calls will require an 85 second connect time overhead.

Type 4 (Single-use Cashless calls)

PSTN or ISDN originated calls to destinations which will answer the call. These calls will require an 85 second connect time overhead.

Type 5 (Multi-use Cashless calls using short codes)

PSTN or ISDN originated calls to destinations which will answer the call. The destinations will be specified in the site file. These calls will require an 85 second connect time overhead.

Type 6 (User-defined Ordinary calls)

PSTN or ISDN originated calls to sites which will answer the call. These calls will require a 25 second connect time overhead. It is intended that this call type will be used to overlay small one-off patterns for test purposes.

Type 7 (Featurenet Ordinary calls)

Featurenet originated calls which will terminate on Featurenet sites. Each Featurenet "cluster" will have its' own zone and calls will be confined to it. These calls will require a 25 second connect time overhead.

Type 8 (Featurenet Break out)

Featurenet originated calls which will terminate on ordinary PSTN or ISDN sites. These calls will cross zone boundaries and will require a 25 second connect time overhead.

Type 9 (Featurenet Break in)

PSTN or ISDN originated calls which will terminate on a Featurenet line. These calls will cross zone boundaries and will require a 25 second connect time overhead.

It will however be realised that the system will be just as applicable to any number of call types.

The zone field 53 allows the operator to define which zone the calls are to be made from. Each zone on the list will have a number of sites 2 with remote terminals 2a, 2b, 2c, 2g, 2h, 2i suitable for transmitting calls from that zone and the sequencer 3 will limit the sites 2 used so as to select only such sites 2 that are suitable for making the calls. Thus in this example, the sequencer 3 can only select remote terminals 2a, 2b, 2c, 2g, 2h, 2i at sites 2 within the NHC zone, for transmitting calls.

The charge band field 54 indicates the charge band that the calls are to be made under. In the present example, the charge band is set to local, and this means that only sites 2 with remote terminals 2a, 2b, 2c, 2d, 2e, 2f capable of receiving calls from the NHC zone under local rate charges are suitable for receiving calls. The remote terminals of sites 2 that are capable of receiving calls under a selected charge band are listed in the destinations file. This lists for each transmit only or two-way terminal, all the terminals that are capable of receiving calls and the charge band that the call may be made under.

The tariff rate field 55 indicates the tariff that is to be charged for making the call. Thus, for example if the call is made at the weekend, the call must be charged at the weekend rate, however if the call is made during the week, the call may be made in the evening, i.e. under cheap rate conditions, or during the day, i.e. under peak rate conditions. By selecting the tariff rate, the operator limits the time during which the calls may be scheduled, such that the calls are made during the time period in which that particular tariff is in force.

Finally, the number of calls field 56 specifies the number of calls that are to be scheduled by the sequencer 3 using those particular call pattern definitions.

It will be realised that the operator may decide to schedule several different types of call for the same day. This can be done by maintaining the same day in the day field 51 whilst altering any of the other call pattern definitions to define the calls as required. Thus for example, the operator may decide to define 2000 local type 01 calls from zone NHC, as shown in FIG. 3 and then subsequently define a further 2000 national type 01 calls from zone NHC simply by changing the call definition in the charge band field 54.

The total number of calls scheduled by the sequencer 3 is recorded in the total number of calls field 50. Typically, for a complete week the sequencer 3 may be expected to schedule up to 280,000 calls between sites spread out over the whole network.

It will be realised that the type of GUI used is not essential to the present invention as long as it allows the operator to specify a sufficient number of call pattern definitions for the sequencer 3 to define a list of calls. Thus, for example, one alternative is to provide a sequence of windows, with each window being used to specify details of a separate call pattern definition.

Once defined, the call pattern definitions are saved in the memory 12 of the sequencer 3. The call pattern definitions are then translated into a flat list of calls which are then scheduled by the sequencer 3. This is generally done by scheduling all the calls for a particular zone on a particular day at a single time and then repeating for other zones and/or days as necessary. The call pattern definitions also define part of a list of constraint criteria that must be satisfied in order for the calls to be scheduled correctly. The remaining call constraint criteria are derived from information stored in a sites file and a destinations file, both of which are stored in memory 12.

The sites file, which is shown in Table 1 below, is used to ensure that the correct sites 2 are used for transmitting and receiving calls defined by the call pattern definitions.

The sites file contains in fields 1, 2 and 3 the area code of the site 2, the telephone number of the site 2 and the telephone number of the monolog, respectively. These details, along with the remote terminal ID contained in field 4 provide all the information required for a call to be made to the remote terminal of that site 2. This allows remote terminals of other sites 2 to make calls to the site and for the set of instructions generated by the sequencer 3 to be transferred to the sites 2 via the PSTN 1.

Field 5 of the sites file is a description used by the master controllers 6 to identify the remote terminal. Field 6 is used to describe the working status of the remote terminal, i.e. working or not working, whilst fields 9 and 11 store data to indicate the type of telephone exchange the terminal is connected to and the location of the site.

The important fields as far as defining the constraints criteria is concerned are fields 7, 8, 10 and 12. Field 7 is a flag used to indicate which mode of operation the remote terminal 2a, 2b, 2c, 2d, 2e, 2f, 2g, 2h, 2i is capable of operating in i.e. transmit only, receive only or two-way communication. This will consequently effect whether the sequencer 3 is able to schedule the remote terminal of the site 2 to transmit or receive calls.

Field 8 indicates the time during which the set of information defining the calls, as stored in the call pattern files, is to be downloaded to each site 2 from the master controller 6. During this process the remote terminal is busy and is therefore unable to receive or transmit calls. As a consequence of this, the sequencer is unable to allocate a call to this remote terminal at this time.

TABLE 1

| Field | Width | Function | Format | Remarks |
|---|---|---|---|---|
| 1 | 6 | STD Code | 999999 | Area code of site |
| 2 | 8 | Number | 99999999 | Telephone number of site |

TABLE 1-continued

| Field | Width | Function | Format | Remarks |
|---|---|---|---|---|
| 3 | 8 | Monolog | 99999999 | Telephone number of Monolog |
| 4 | 5 | ID | 99999 | Site password |
| 5 | 20 | Description | Free text | Controller description of site |
| 6 | 4 | Status | GOOD BUST | Current status of site |
| 7 | 1 | O/G Flag | I O B ‖ | I/C, O/G or B/W site |
| 8 | 4 | Update Time | HHMM | Start of upload period |
| 9 | 2 | Exchange type | AA | 2 character exchange code for results |
| 10 | 3 | Zone | AAA | Zone ID |
| 11 | 3 | Home Zone | AAA | Zone ID proper to DDI number |
| 12 | 10 | Call Type Flag | AAAAAAAAAA | Call type availability |
| 13 | 46 | Location | Free text | Address of site |

Field 10 indicates the zone in which the remote terminal is located. This is therefore used in conjunction with the zone field 53 and the charge band field 54 to determine whether the remote terminal is in the correct zone for making or receiving calls.

Finally, field 12 is a call type flag which indicates the type of calls that sites are able to handle. This is particularly relevant in a system in which calls of types 3–9 are to be made as these calls can only be handled by certain remote terminals. Accordingly, when the sequencer 3 is scheduling calls, it will use this field to determine if the remote terminal of the respective site is suitable for making/receiving the type of call to be scheduled. If not, an alternative site having a suitable remote terminal can be chosen.

The indication of the call type for which the remote terminal can be used is determined from the 10 characters in the field 12. The 1st character position indicates type 1 calls, the 2nd type 2 calls, and so on. Each character position will contain 1 of the following characters, each of which represent the remote terminals ability to make/receive calls of the respective call type:

| B | Bothway calls of this type; |
|---|---|
| I | Incoming only calls of this type; |
| O | Outgoing only calls of this type; and, |
| X | Not useable for this type of call. |

The final constraints that are introduced by the system itself include times when the system is shut down for maintenance or other reasons and is therefore inoperable. Such information is stored in the sequencer algorithm itself.

Thus, to be able to schedule the call, the sequencer 3 must analyse all the constraints placed upon it by the call pattern definitions, the sites information and the systems information. These constraints may be defined mathematically by a number of sets and functions as shown below.

In order to simulate the operation of a real PSTN 1, it is important that the sequencer 3 schedules calls such that the calls are randomly spread out over the course of the day. This is achieved by selecting a random start time for each call.

Furthermore, the calls must be spread out reasonably evenly between the various remote terminals 2a, 2b, 2c, 2d, 2e, 2f, 2g, 2h, 2i of the sites 2. In order to ensure such an even spread of calls between the terminals, the sequencer 3 schedules the calls so as to minimize the difference in use of each remote terminal.

Expressed mathematically, this is achieved by minimising the standard deviation of the utilisation of each remote terminal, with utilisation being defined as the amount of time during which the remote terminal is busy divided by 24 hours. A mathematical expression for the variance in utilisation of each remote terminal can be derived from the mathematical representation of the constraints satisfaction problem, as explained below. The sequencer generally schedules the calls so as to minimise variance and hence the standard deviation of the utilisation of the remote terminals.

Alternatively, the sequencer 3 can be configured to pursue other objectives, such as ensuring that all the sites 2 within a given zone make and/or receive a set number of calls or ensuring that certain sites 2 make a much higher number of calls to simulate an overloaded situation. This will be understood by a person skilled in the art and therefore only the minimisation of variance will be described in detail.

Defining the Problem Mathematically

Constraint Satisfaction Problem(CSP) is the problem of finding an assignment of values to a number of discrete variables with finite domains such that a set of constraints is satisfied. Assignments that satisfy the constraints are called solutions of the CSP. If the goal is also to find the solution that optimises a cost criterion then this variation of the CSP is called a Constraint Satisfaction Optimisation Problem (CSOP). The call scheduling problem could be classified as a CSOP. Intuition suggests that the call scheduling problem is NP-hard which means that no algorithm exists which finds the optimal solution in polynomial number of steps. It may be difficult though to produce a formal proof for that.

In the following, we provide a formal description of the call scheduling problem by explaining the entities and their relationships.

Problem Instance

An instance of the call scheduling problem can be fully defined by the following list of sets and functions. These sets and functions are not directly provided by the user but they are generated by the system after pre-processing of both the user input and data describing the network testing architecture.

Sets

Set of Zones Z: $Z=\{z_1, z_2, \ldots, z_{ip}\}$ where I is the number of zones.

The test sites are divided into a number of zones which correspond to big geographical areas such as Midlands, Scotland, etc.

Set of Call Types Ct: $Ct=\{ct_1, ct_2, \ldots, ct_j\}$ where J is the number of call types.

Depending on the testing required there may be one or more call types (e.g. chargeable, non-chargeable, FeatureNet call, chargecard call, etc.).

Set of Charge Bands Cb: $Cb=\{cb_1, cb_2, \ldots, cb_K\}$ where K is the number of charge bands.

Usually, we consider three charge bands Local, Regional, National but others such as Free-call, Mobile, etc. may also be considered Set of Tariff Rates Tr: $Tr=\{tr_1, tr_2, \ldots, tr_L\}$ where L is the number of tariff rates.

Examples of tariff rates are the day rate, the night rate, and the weekend rate. This set gives all the possible tariff rates that may apply in the network to be tested.

Set of Sites S: $S=\{s_12_2, \ldots, s_M\}$ where M the number of sites.

This set gives all the sites that are available in the network architecture for making or receiving calls Set of Site Types Tp: $Tp=\{I,O,B\}$ As mentioned above there are three different types of sites which are Incoming, Outgoing, and Both ways (i.e. both incoming and outgoing calls capability).

Set of Calls C: $C=\{c_1, c_2, \ldots, c_N\}$ where N is the number of calls.

These are the calls that need to be scheduled. The number of calls and their attributes are specified by the user with the assistance of the user interface.

Set of Time Slots T: $T=\{t_1, t_2, \ldots, t_o\}$ where o the number of time slots in the scheduling horizon (i.e. time period during which we want to generate the calls).

This set controls the granularity of the scheduling system. Each call can be allocated one or more consecutive slots from this set. The actual duration of the calls is specified by the user in terms of milliseconds. The scheduling system ensures that the total duration of the consecutive slots allocated to a call is equal or greater to the duration in milliseconds of that call. Usually, 1 minute slots are of sufficient accuracy for the purposes of efficient scheduling and also for not wasting too much time in not fully utilised slots. If the scheduling horizon is 24 hours, this results in a total of 1440 slots for allocation for each site. T in this case is equal to $\{1, \ldots, 1440\}$.

Functions

The sets listed above give an accurate picture of the different entities of the problem. The different relations between these entities can be defined by the following list of functions.

Call Information Function (CIF):

$$(z, ct, cb, tr)=CIF(c), C \rightarrow Z \times Ct \times Cb \times Tr$$

This functions gives us for each call c that requires scheduling the values for the various call attributes. Attributes related to scheduling process described in here are the zone of the call z, the type of the call ct, the charge band of the call cb and its tariff rate tr.

Site Information Function (SIF).

$$(z, tp)=SIF(s), S \rightarrow Z \times Tp$$

For each site s, it is required to know its zone z and type tp. The above user defined function is providing that.

Site Availability Function (SAF):

$$\text{Available}=SAF(s, t), S \times T \rightarrow \{0, 1\}$$

This function gives us the availability of a site s during the time slot t. Using this function, the user may specify maintenance periods, update times for the sites, etc. The algorithm has to ensure that no calls are scheduled during these periods.

Incoming Site Function (ICS):

$$\text{Destinations}=ICS(s, cb), S \times Cb \rightarrow 2^s$$

This function takes as arguments a site s and a charge band cb and returns a list of other sites in the testing architecture for which a call made from site s to them would belong in the charge band cb.

Tariff Rate Function (TR):

$$tr=TR(t),\ T \rightarrow Tr$$

This function gives the tariff rate for a certain time slot of the scheduling horizon.

EndTime Function (ET):

$$et=ET(st,\ cb,\ ct),\ T \times Cb \times Ct \rightarrow T$$

The user has also to specify the required duration of calls. This function provides this facility by giving the end time slot et for a call starting at the time slot st, with charge band cb and call type ct. The call will take place during all the consecutive slots starting from st up to et. As a matter of convention the slot with the value et is excluded.

All the sets and functions mentioned so far can fully specify an instance of the call scheduling problem. The algorithm has to generate a solution to this problem instance which is of the following form.

Solution

A solution to the problem is a scheduling function of the form:

$$F: c \in C \rightarrow (s_o,\ s_i,\ st) \in S \times S \times T$$

This means that for each call requiring scheduling, the problem solver has to specify three decision variables. These are the origin of the call $s_o$ (outgoing site), the destination of the call $s_i$ (incoming site) and the start time slot st. This solution should satisfy the following constraints.

Constraints

Let us consider the following definitions for a single call c:

$$(z,\ ct,\ cb,\ tr)=CIF(c),$$

$$(z_o,\ tp_o)=SIF(s_o),$$

$$(z_i,\ tp_i)=SIF(s_i),$$

$$et=ET(s_o,\ st,\ cb,\ ct),$$

For the solution to be a feasible, the following conditions should hold.

$$z_o=z$$

The zone of the source site $z_o$ should be equal to the zone z of the call.

$$tp_o=O \lor tp_o=B$$

The type of the source site should be either outgoing or both ways so that it can make the call.

$$tp_i=I \lor tp_i=B$$

The type of the destination site should be either incoming or both ways so that it can receive the call.

$$s_i \in ICS(s_o,\ cb)$$

The destination site s, should belong to the set of sites for which a call from $s_o$ will be in the desired charge band cb.

$$tr=TR(st)$$

The tariff rate for the start time st of the call c is equal to the desired tariff rate tr for the call.

Additionally, let us consider the time slots $T_c$ during which the call c is going to take place:

$$T'_c = \{t \in T | st \leq t < et\},$$

During this time the tariff rate should remain the same and both the source and destination sites should be available (i.e. no update times, maintenance periods). This can be expressed as follows:

$$\forall t \in T'_c,\ TR(t)=tr_o,\ SAF(s_o,\ t)=1,\ SAF(s_i,\ t)=1,$$

Finally, the resource constraints are dictating that all sites should perform only one operation at a time (i.e. either receive or make calls). This can be expressed as follows.

$$\forall c_i,\ c_j \in T,\ c_i \neq c_j, if T'_{c_i} \cap T'_{c_j} \neq \emptyset$$
$$\Rightarrow (\{s_o(c_i),\ s_i(c_i)\} \cap \{s_o(c_j),\ s_i(c_j)\} = \emptyset)$$

The above formula may take other less strict forms in certain network testing problems. For example, if we want to test non-chargeable calls (where the destination has to be engaged so that the customer is not charged) the source of a normal chargeable test call and the destination of the non-chargeable test call must be set to the same value.

Optimisation

Leaving behind the various constraints of the problem, we look at the various criteria that the solution has to optimise. There are two main objectives for this problem:

Objective A.

Spread calls across sites in the same zone.

This objective states that the utilisation of sites in the same zone should be as uniform as possible.

Objective B.

Spread calls throughout the day.

This objective states that the calls for a site should be as uniformly distributed as possible with respect to their start times.

Thus, the solution is a scheduling function of the form:

$$\text{Utilisation}\ (s \in S) = \frac{|T|}{\sum_{t \in T} |C'(s,\ t)|}$$

In this example, the solution is sought which maximizes the following optimization criteria minimise $\sigma^2$ (Utilisation) ($\sigma$=Variance) for sites $\in$ zone z for all zones $\in Z$.

In practice the minimisation of the utilisation is achieved by the way in which the sequencer 3 selects the sites 2 to make and/or receive calls. This will now be explained with reference to FIGS. 4a to 4d which show the steps that the sequencer 3 goes through to schedule the calls.

Figure 4A:
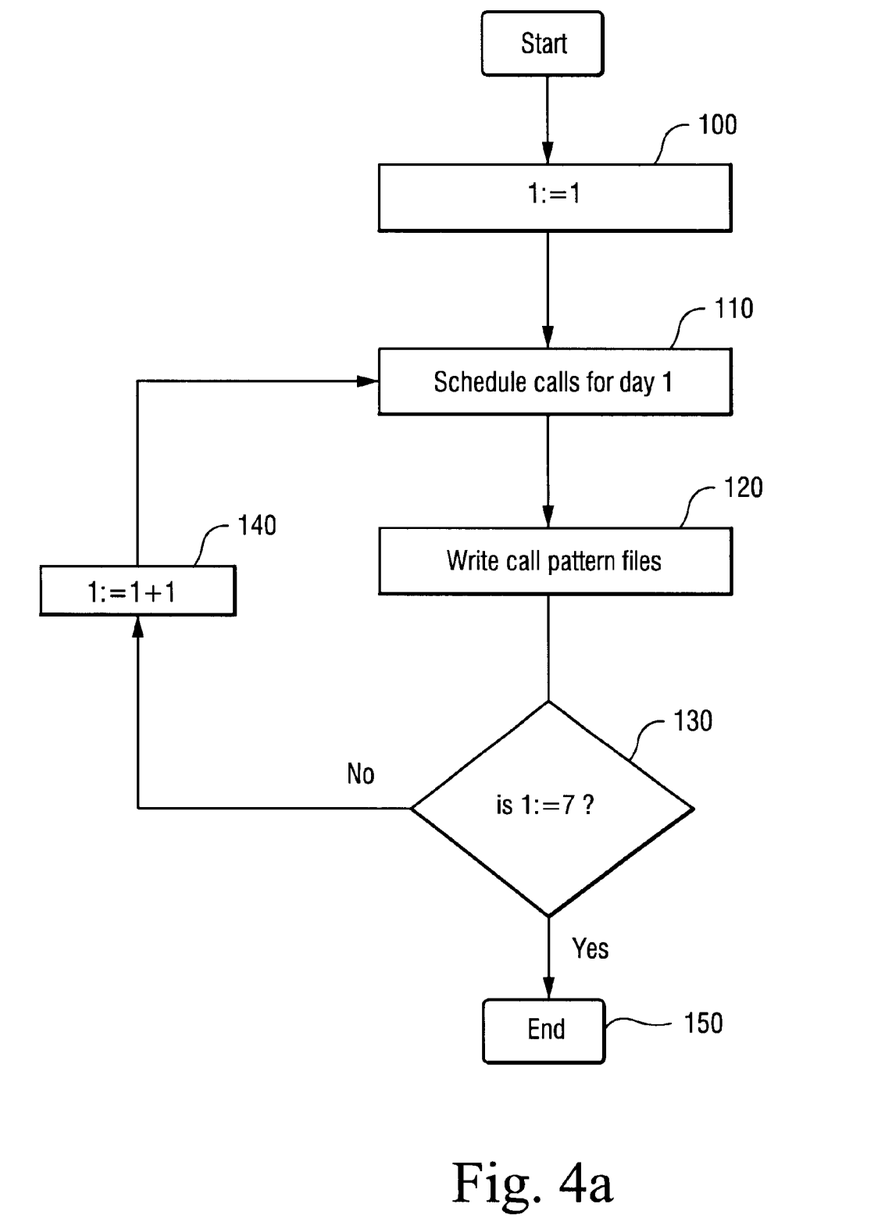

FIG. 4a is a flow diagram showing the general operation of the sequencer 3 to schedule calls for an entire week. Initially, the operator of the sequencer 3 will enter the call pattern definitions as described above. As the call pattern definitions have been entered, the sequencer 3 will set a daily indicator tag I=1 (step 100) and then proceed to schedule calls for day I (step 110). This procedure will be described with reference to FIGS. 4b to 4d.

Once the calls for day I have been scheduled, the data defining the calls is written to a respective call pattern file for each site 2 (step 120). The sequencer 3 will then determine if the value of the day indicator tag is 7 (step 130) to determine whether the entire weeks worth of calls have been defined. If the indicator tag I is less than 7, the sequencer 3 will add one to the indicator tag I such that I=I+1 (step 140) and proceed to schedule calls for the day I=I+1 (return to step 110). If the day indicator tag I=7 then all the calls for the week have been defined and the sequencer programme will end (step 150).

Figure 4B:
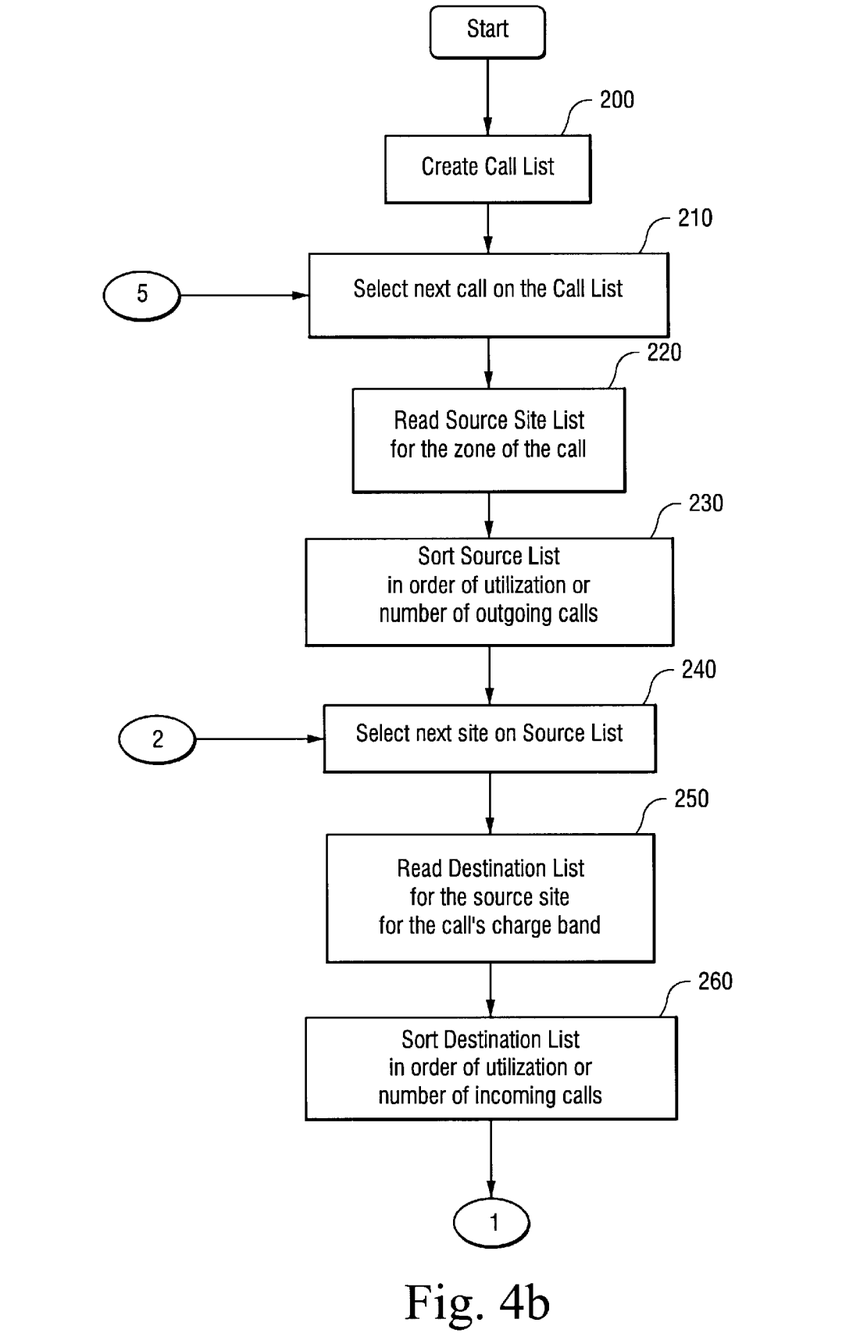
Figure 4C:
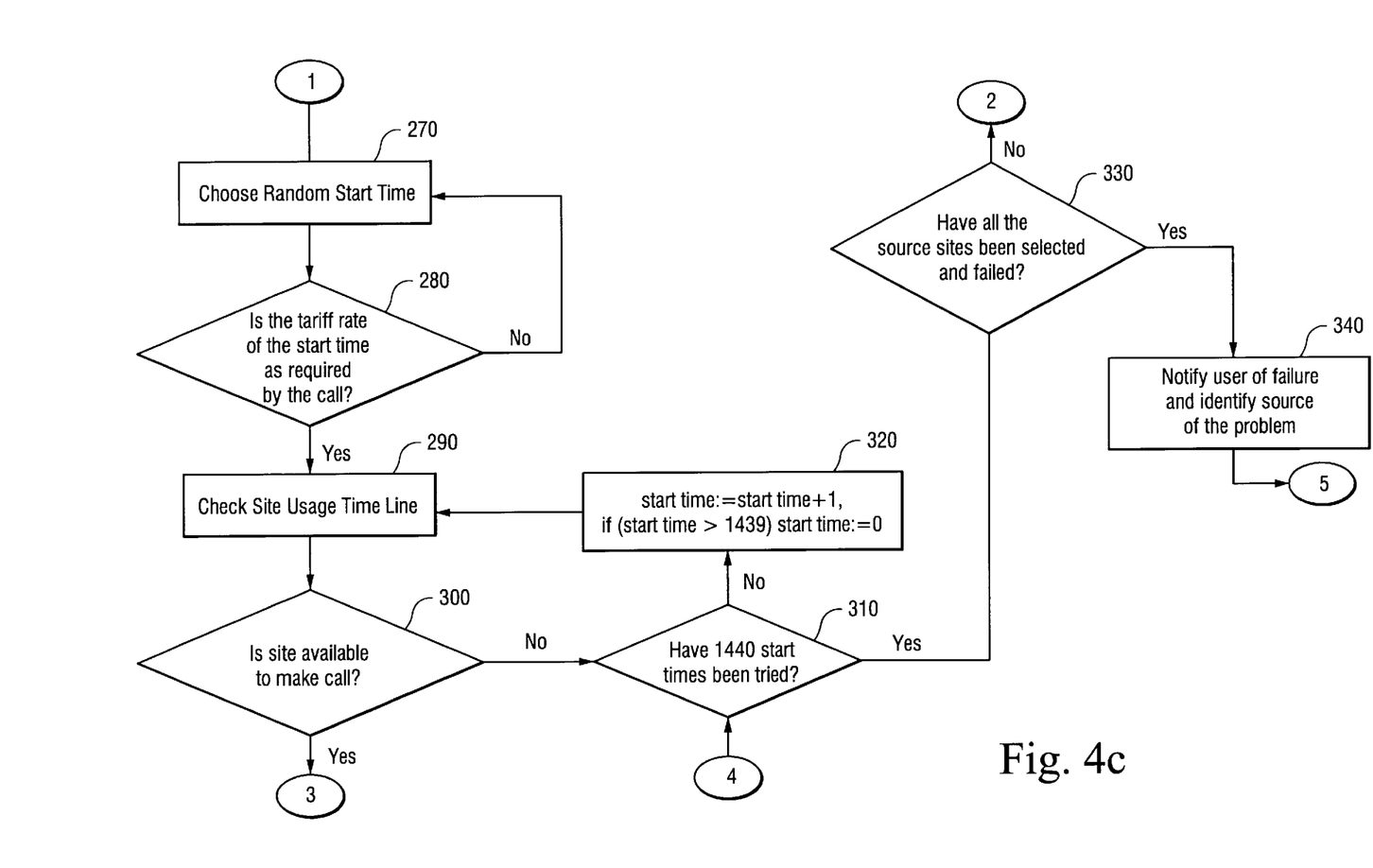
Figure 4D:
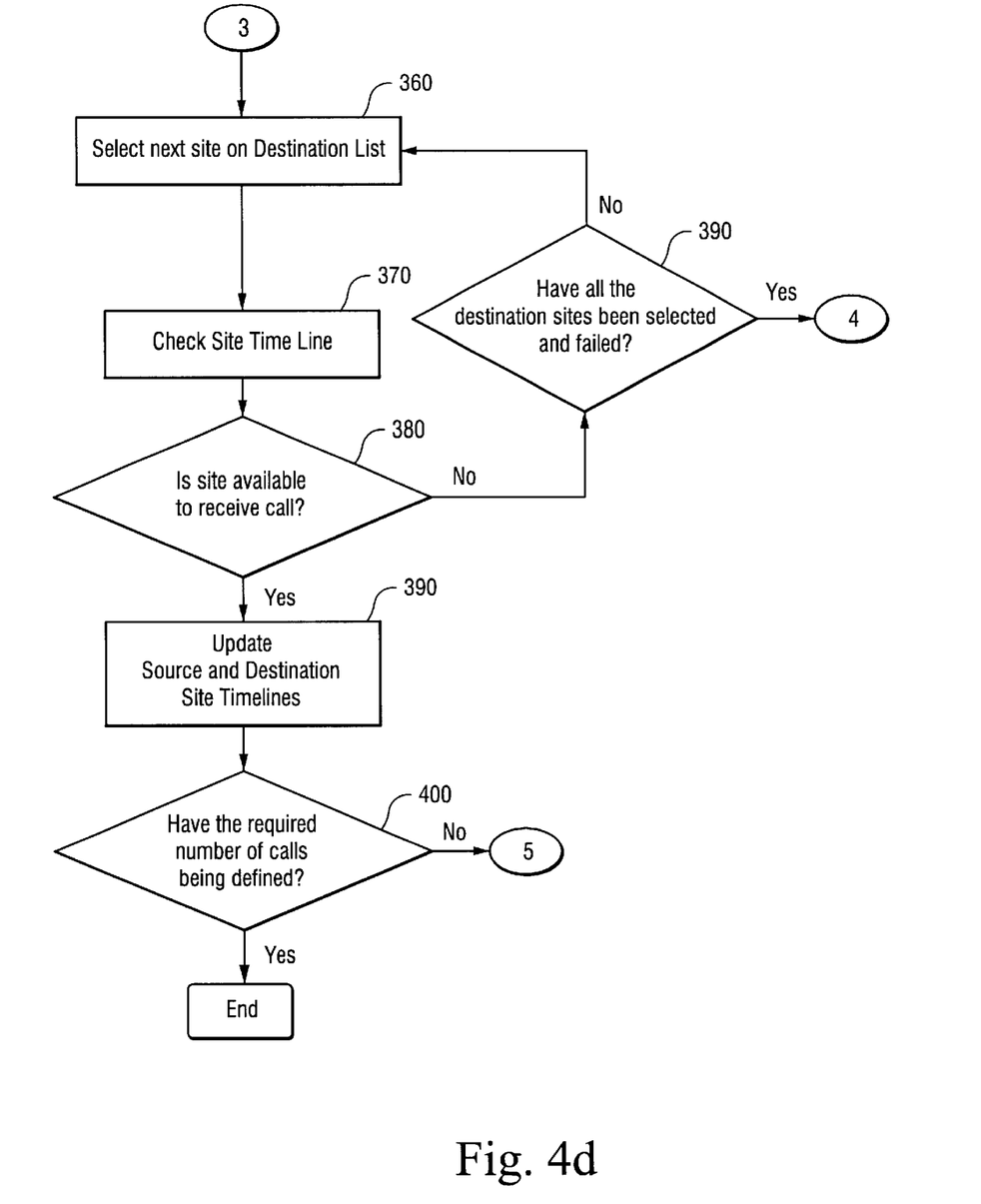

FIGS. 4b, 4c and 4d describe the procedure for scheduling the calls defined for day I.

Initially, the sequencer 3 will translate the call pattern definitions, input by the operator, into a call list (step 200). This is achieved by generating an undefined list of calls with one call corresponding to each call that is to be scheduled. Thus, for example, if the call pattern definitions require that 2000 type 1 calls be made in the local charge band from zone NHC (see FIG. 3), then the sequencer will generate a call list with 2000 type 1 calls, each of the calls being in the local charge band from zone NHC.

The sequencer 3 will then begin scheduling the calls. In order to do this, the sequencer must first select the next call on the call list (step 210).

The sequencer 3 will then analyse the constraints criteria to determine which sites 2 have remote terminals 2a, 2b, 2c, 2g, 2h, 2i which are suitable for transmitting the type of call which has been defined. Thus in the present example, the call pattern definitions shown in FIG. 3 indicate that the list of calls to be scheduled will consist of local type 1 calls (see fields 52 and 54) made from zone NHC (see field 53) on a Sunday (see field 51). The sequencer 3 will then search through the sites files of all the sites 2 and select any site 2 located in the NHC zone that has a remote terminal suitable for transmitting type 1 calls. These sites 2 form a source site list.

Once the sequencer 3 has read the source site list (step 220), it proceeds to sort the source site list into order of either utilization or number of outgoing calls (step 230). Utilization is defined as the amount of time during which the remote terminal is busy divided by 24 hours. In order to sort into order of utilization, or number of calls, the sequencer 3 must constantly be able to determine the time and duration of use of each site 2 and the time that calls are to be made.

In the case of determining the utilization, this is achieved by maintaining usage time lines representing the usage of a particular site 2 on a particular day. The usage time lines, which are stored in memory 12, are binary data strings divided into 1440 bits, with each bit representing the usage of the respective site 2 during a one minute period of a particular day. Thus the 1440 bits in the bit string show the utilization of the site over a full 24 hour period with a binary "1" representing the site being in use and a binary "0" representing the site being available, or vice versa.

Each site 2 has predetermined busy times allocated to it during which the call pattern files are downloaded from the master controllers 6, maintenance is carried out and call charge results are uploaded over the PSTN 1. These time periods cannot therefore be used for generating or receiving calls from other sites 2 and they are therefore registered on the usage time line as periods when the remote terminal is busy.

From the usage time lines it is possible for the sequencer 3 to determine the utilization of each site 2 and therefore arrange the sites on the source list in order of ascending utilization, the least utilized site 2 being at the top of the list.

In addition to the usage time line, each site 2 also has associated therewith a call start time line which indicates the start time of any outgoing calls. The call start time line is also a 1440 bit binary data string, with each bit representing whether an outgoing call has been started during that particular minute of the respective day. As with the usage time line, the call start time line is stored in the memory 12.

The call start time lines are used to order the source site list according of number of calls made. In this instance, the sequencer 3 determines from the call start time line the number of calls made by each site (which does not include predetermined busy periods) and places the sites in ascending order with the site that has the least number of calls assigned to it being at the top of the list.

Initially, in absence of any further use other than the predetermined usage, the majority of sites 2 will have the same amount of utilization or the same number of calls. If this is the case, the sites are ordered arbitrarily.

The sequencer 3 proceeds to allocate the calls on the call list by selecting the next site on the source list (step 240), thereby selecting the site 2 with the current lowest utilization or lowest number of calls, depending on the method of sorting that has been used.

Once the source site has been selected, the sequencer 3 accesses a destination file, which includes a list of suitable destination sites for each respective source site for calls of the selected call type made under certain charge band and tariff rate criteria. The destination sites 2, which are sites suitable for receiving calls with the defined call pattern definitions, form a destination list. The sequencer 3 reads this destination list, for the selected source site, for the charge band entered in the call patent definitions (step 250), and sorts the destination list into order of utilization or order of number of incoming calls (step 260). This is achieved in a similar manner to the ordering of the source site list (step 230) and will therefore not be described in detail.

As shown in FIG. 4c, the sequencer 3 then selects a random start time (step 270) and checks to determine whether the random start time would result in the call being made with the tariff rate defined by the call pattern definitions (step 280).

As mentioned above, the call pattern definitions include an indication of tariff rate e.g. day, night and weekend, and it is therefore important that the chosen start time for the call will result in the call having the tariff rate desired. In the case of calls made during midweek, the tariff rate may be either the day tariff rate or the night tariff rate. Thus, for example, if the day tariff rate is selected, the start time which the call is allocated must fall within the times during which the PSTN 1 is charging calls on the day tariff rate.

Should the random start time be unsuitable for use, the sequencer 3 will repeatedly generate random start times until a start time with the correct tariff rate is generated. Since there are usually only two tariff rates for any one day (i.e. day or night), it will generally only require a couple of attempts to generate a suitable time.

Once the tariff rate of the random start time is as required by the call pattern definitions, then the sequencer 3 proceeds to check the usage time line of the selected source site (step 290) to see if it is available to make the selected call (step 300). For this to be the case, the site 2 must be available for use for the entire call duration and not just at the call start time.

The call duration is predetermined from the tariff rate file which specifies the duration which the defined call should have depending on the half hour period during which the call occurs and the call charge band that the call is to be made under.

Should the site 2 not be available to make the call at the randomly selected start time, the sequencer 3 proceeds to scan the usage time line from the randomly selected start time until the end of the day, and then from the beginning of the day until the randomly selected start time, until the call is allocated or the entire usage time line has been checked.

This is achieved by utilizing a start time variable which has a numerical value equivalent to the start time, in minutes, which was last tried by the sequencer. It is therefore initially set to represent the randomly selected start time in minutes. Once the sequencer 3 has determined that the selected start time is unsuitable, the sequencer 3 will check a record of the number of different start times tried for that particular site to determine whether 1440 different call start times have been tried (step 310). This variable is reset every time a site is selected (step 240) and is used to indicate whether all the possible start times have been tried for the site.

If 1440 different start times have not been tried, the sequencer 3 increases the current start time variable by 1 minute (i.e. start time=start time+1) (step 320) and checks the site time line for the new selected start time (step 290). Each time a new start time is checked, the record of the number of different start times tried will be updated to indicate that a further start time has been tried.

If at any time the start time variable becomes greater than 1440, the number of minutes in a day, this represents a call start time occurring after the end of the day. Accordingly, the start time variable is reset to 0, causing the scanning of the time line to restart from the beginning of the day (step 320).

Each time the site usage time line is checked (step 290) the tariff rate of the selected start time is checked to see if it is the tariff rate required by the call pattern definitions. If this is not the case the start time will be rejected and the sequencer will proceed to check the record of the number of start times tried (step 310) and, if this is less than 1440, try a new start time (step 320) as described above.

In practice, once the sequencer determines a start time has an incorrect tariff rate it will skip several start times until it again finds a start time with the correct tariff rate, thereby increasing the speed of the call start time selection. If this is done, the record of the number of start times that have been tried will be increased by a number equivalent to the number that would have been tried if no start times were skipped. As a result, when the record of the number of different start times tried indicates that 1440 different start times have been tried, then all possible start times on the time line will have been tried and the start time variable will once again equal the randomly selected start time.

Should all 1440 different start times be tried and no suitable start time be found, the sequencer 3 will determine whether all the different source sites on the source site list have been tried (step 330). If this is not the case, the sequencer 3 will select the next available site from the source site list (step 240). Alternatively, if all the source sites have been tried, the sequencer 3 will notify the operator of the failure indicating the problem (i.e. no start time allocatable) (step 340). The sequencer 3 will then attempt to schedule the next call on the call list although in some cases, it may be preferable to exit the operating programme allowing the operator to enter a new call pattern definition that will allow a list of calls to be scheduled.

Should a suitable start time be chosen for which the site 2 is available to make a call, then the sequencer 3 proceeds to select a destination site 2 as shown in FIG. 4*d*. In order to do this, the next site 2 on the destination list is selected (step 360) and the usage time line of that site is checked (step 370) to see if it is available for receiving the call defined above (step 380).

If this site is not available for receiving the call, the sequencer checks to see if all the sites on the destination list have been tried (step 390). If not, the next site on the destination list is selected (step 360) and the process repeated until a suitable site is selected.

Should no destination site be available for the defined call, the sequencer 3 will determine whether 1440 different start times were tried for the source site (step 30) and if not proceed to select a new time (step 310 and 320).

Should at any point no site 2 be available for making or receiving calls (step 330), the sequencer 3 will notify the user of the failure (step 340) and move on to either the next call on the list, or the next list of calls. If no more calls can be scheduled which will generally only occur when such call pattern definitions are made that is impossible for the sequencer 3 to allocate the number of required calls to the number of available remote terminals, then the sequencer 3 will stop allowing the user to redefine the call pattern definitions to a level that are available for the system and rerun the sequencer.

When the sequencer 3 has defined a call that has successfully been allocated to both source and destination sites 2, the sequencer will update both the usage and call start time lines of both the source and destination sites (step 390). The usage time line is updated to represent that the site is now in use for the entire duration of the call by replacing the binary "0"s in the section of the time line corresponding to the call with binary "1"s. This then indicates that the remote terminal of the site 2 is unavailable for making calls during this allocated time, i.e. the site 2 becomes busy. Similarly, the call start time line of the source site will be updated to indicate the time at which the outgoing calls is to be made.

When the sequencer 3 has updated the call start and usage time lines, it will then determine whether the required number of calls i.e. all the calls on the call list, have been defined (step 400). It will repeat the procedure as necessary until the required number of calls, as defined by the associated call pattern definitions, have been allocated. Each time the procedure is repeated the source and destination lists are re-ordered in order of utilization, thereby preventing the same source and destination sites being repeatedly chosen.

At this point it is worth noting that type 2 calls may advantageously be handled slightly differently. These calls are non-chargeable calls made to a busy (engaged) tone and it is therefore necessary for the source site to dial in to a destination site which is actually making a call. The usage time line indicates when sites are in theory busy, however, times designated for system maintenance for example, only indicate that the site is reserved for other purposes and not that a call is being made. Accordingly, if the source site were to ring during a maintenance period, it is possible that the destination site would be available and the engaged tone would not be obtained.

In order to overcome this, the call start time line of the prospective destination site 2 is analysed instead of the usage time line. At the time when the destination site is making an outgoing call, it is ensured that the destination site will be busy and that the source site will receive the engaged tone. Accordingly, the source site 2 can be instructed to call the busy destination site 2, 10 seconds after the destination site 2 has started making its own outgoing call. This ensures that the source site will obtain an engaged tone and will not be actually connected to the destination site.

Obviously the chances of finding a suitable destination site 2 increase the more calls have already been assigned, and it is therefore preferable to assign type 2 calls after all other call types have been scheduled.

Once all the calls, defined by the call pattern definitions have been allocated, the sequencer 3 then generates the call pattern files, which are then transferred to the memory 17 of the file server 5, where they are stored in a call pattern directory. The form of a call pattern file which is shown in Table 2 below is updated by entering data into the relevant fields to instruct the remote terminal of the site to make the call.

TABLE 2

| Field | Width | Function | Format | Remarks |
|-------|-------|----------|--------|---------|
| 1 | 6 | Time of day | HHMMSS | HH hours, MM Minutes, SS Seconds |
| 2 | 2 | Call type | 01 to 99 | See below |
| 3 | 9 | Duration | 000000000–999999999 | Milliseconds |
| 4 | 4 | Destination | 0001–9999 | Site ID from sites file |

Field 1 indicates the time at which the call is to start and field 2 indicates the type of call to be made, as defined above. Field 3 indicates the call duration, which is specified in milliseconds but will correspond to the duration specified in the tariff rate file. Field 4 indicates the site ID number of the destination site, which corresponds to the ID number given in the field 4 of the sites file for the destination site of the call.

Thus, once the calls have been successfully allocated, data instructing the remote terminals of the sites 2 is written to the respective call pattern files, instructing the remote terminals to make and/or receive calls as required.

In fact, in the present example, only instructions to make calls are given as the remote terminal of the destination site 2 will receive the call automatically as with normal telephone calls.

In addition, in the case described above with regard to type 2 calls, the call to be scheduled is initially assigned to a suitable source site 2 to the nearest minute. A suitable destination site is then found which is also making a call starting at the same designated start time and the call pattern file for the source site is then generated. However, when the start time is inserted in field 1 of the call pattern file, the determined start time is increased by 10 seconds, thus ensuring that the destination site is busy when the call commences.

As mentioned previously, the call pattern files, once completed, are transferred to the sites 2 via the file server 5 and the master controller 6. Transfer from the master controller 6 occurs at a predetermined time each day, with this update time being defined in the sites file for the respective site 2. The update is repeated at 24 hour intervals and it is essential that the call pattern file contains instructions defining all the calls that are to be made in the 24 hour period following the upload of the call pattern file. Thus if the call pattern file is uploaded, for example, at 7:00 am, then the call pattern file must contain instructions concerning any calls to be made between that time and 7:00 am the subsequent day.

However, the call pattern definitions entered by the operator are for 24 hour periods corresponding to actual days, i.e. running from 0:00 am of one day to 0:00 am of the subsequent day. As the calls are scheduled in accordance with these call pattern definitions, all the calls scheduled at any one time will be for the day defined by the call pattern definitions.

This problem is overcome by the way in which the sequencer 3 updates the call pattern file of a site 2. As opposed to simply creating call pattern files which correspond to actual days, each call pattern file for each site 2 corresponds to the 24 hour period between consecutive uploads of the consecutive call pattern files to the site 2. When a call is defined it is automatically allocated to the call pattern file which corresponds to the 24 hour period during which the call is to be made. Thus, if as mentioned above, the upload time of a site 2 is 7:00 am, then a call scheduled for 5:00 am on Tuesday morning will be stored in the call pattern file for upload at 7:00 am on the Monday, which provides instructions relating to all the calls made between then and 7:00 am on Tuesday.

In such a situation, producing a single call pattern file for upload at X:00 hours (X being a number between 0 and 24) on a first day and covering the next 24 hour period until the next upload, will require using the last 24-X hours worth of calls scheduled for the first day and the first X hours worth of calls scheduled for the following day. Therefore to make a single call pattern file, for download on the first day, a call pattern definition for at least two days is required. It is therefore preferable to define calls for a week at a time.

It will be realised that even if this method is employed, it can result in a call deficit on days when there is a change over between different call patterns. This arises as it is desirable to change the calls from those defined by a first set of call patterns to those defined by a second set of call patterns at midnight. However, the download of the call pattern data file only occurs at the predetermined upload time and it is therefore necessary to ensure that the call pattern data file includes calls defined by both sets of call patterns.

Thus, for example, the first set of call pattern definitions will define calls up until 0:00 am on the changeover day (i.e. midnight on the day before changeover day), and on the changeover day itself. The call pattern data file is however configured to include calls up until the time of the next upload e.g. at 7:00 am. Accordingly, when the call pattern data file is initially generated, any calls defined from 0:00 am to 7:00 am on the changeover day will be calls from the old call pattern definitions.

Similarly call pattern data files are also defined based on the second set of call pattern definitions. However, as the call pattern data file is only uploaded at a predetermined time, e.g. at 7:00 am, calls defined prior to the upload time on the changeover day would normally be included in the call pattern data file of the previous day, which will include only calls defined by the second set of call pattern definitions.

To overcome this a changeover day mode is utilised which ensures that calls are generated for the entire changeover day period as required. In this mode, the sequencer operates to form the call pattern data file for the changeover day by selecting calls defined by the first set of call pattern definitions up until midnight, and selecting calls defined by the second set of call pattern definitions from midnight to the upload time. Once created, the calls defined by the new call pattern data file will automatically change from those defined by the first set of call pattern definitions, to those defined by the second set at 0:00 am on the changeover day, thereby ensuring continuous call definition.

Once the call pattern files have been downloaded the sites 2 then proceed to make and/or receive the calls defined by the call pattern files. These calls are then monitored by the SDP-CSS system 8 which will calculate the charge for each individual site 2.

Concurrently, the log files including the results of calls made are downloaded from the sites 2, via the master controllers 6 to the comparator 9. From this information, a theoretical charge is generated which is compared to the calculated charges generated by the SDP-CSS system 8. This allows a network regulator to verify that the charging system used by the operator of the PSTN 1 functions correctly and, if not, identify any problem.

What is claimed is:

1. A method of creating and distributing call pattern data for use in assessing a communications network, the communications network having a plurality of sites, each operable to transmit and/or receive calls, the method comprising:
   (i) receiving call data identifying number of calls to be made over the communications network, and a time period defining boundaries within which to make the calls;
   (ii) receiving constraint data identifying a plurality of call constraint criteria including receiving and sending capabilities of the respective sites;
   (iii) scheduling the received call data in accordance with the received constraint data, thereby creating call pattern data defining instructions for each of a plurality of the sites to make a plurality of connections across the communications network to one or more other sites within the boundaries of the time period;
   (iv) organizing the call pattern data into a plurality of sub-schedules, each of the sub-schedules corresponding to a different one of said sites;
   (v) distributing the sub-schedules to the respective sites; and
   (vi) operating the sites in accordance with their respective sub-schedule.

2. A method as in claim 1, wherein:
   the call constraint criteria comprises an indication of the type of call to be made, the types of call including simple chargeable and simple non-chargeable.

3. A method as in claim 1, wherein the communications network is divided into a number of zones with the sites being distributed between different zones and wherein:
   the call constraint criteria comprises an indication of the zone from which the calls are to be made.

4. A method as in claim 3 wherein:
   the call constraint criteria comprises an indication of which zones the sites may be located in to receive the call.

5. A method as in claim 1, wherein:
   the call constraint criteria comprises an indication of the rate at which calls are to be charged.

6. A method as in claim 1, wherein:
   the call constraint criteria comprises the requirement that the variation in the utilisation of each site over the time period is minimised.

7. A method of verifying a call charging system of a communications network, the method comprising:
   generating calls between a number of sites of the communications network as in claim 1,
   generating a theoretical charge for the calls, defined for each site, from the call pattern data, and
   comparing the charges assigned to each site by the call charging system to the theoretical charge generated for each site.

8. A method according to claim 1, wherein distributing the sub-schedules to the respective sites is performed at predetermined intervals, and at least some of the sub-schedules comprise call pattern data that relates to successive ones of said intervals.

9. A method as in claim 1, wherein the calls are randomly spread out over the course of the time period.

10. A method as in claim 1, wherein a start time for each call is randomly selected.

11. A method as in claim 1, wherein the sub-schedules distributed to the respective sites allow the communications network to simulate real load conditions.

12. A method of assessing a communications network, the communications network having a plurality of sites, each operable to transmit and/or receive calls, the method comprising:
    (i) receiving call data identifying number of calls to be made over the communications network, and a time period defining boundaries within which to make the calls;
    (ii) receiving constraint data identifying a plurality of call constraint criteria including receiving and sending capabilities of the respective sites;
    (iii) scheduling the received call data in accordance with the received constraint data, thereby creating call pattern data defining instructions for each of a plurality of the sites to make a plurality of connections across the communications network to one or more other sites within the boundaries of the time period;
    (iv) organizing the call pattern data into a plurality of sub-schedules, each of the sub-schedules corresponding to a different one of said sites
    (v) distributing the sub-schedules to the respective sites; and
    (vi) operating the sites in accordance with their respective sub-schedule.

13. A method as in claim 12, wherein:
    the call constraint criteria comprises an indication of the type of call to be made, the types of call including simple chargeable and simple non-chargeable.

14. A method as in claim 12, wherein the communications network is divided into a number of zones with the sites being distributed between different zones and wherein:
    the call constraint criteria comprises an indication of the zone from which the calls are to be made.

15. A method as in claim 14, wherein:
    the call constraint criteria comprises an indication of which zones the sites may be located in to receive the call.

16. A method as in claim 12, wherein:
    the call constraint criteria comprises an indication of the rate at which calls are to be charged.

17. A method as in claim 12, wherein:
    the call constraint criteria comprises the requirement that the variation in the utilization of each site over the time period is minimized.

18. A method of verifying a call charging system of a communications network, the method comprising:
    generating calls between a number of sites of the communications network as in claim 12,
    generating a theoretical charge for the calls, defined for each site, from the call pattern data, and
    comparing the charges assigned to each site by the call charging system to the theoretical charge generated for each site.

19. An apparatus for creating and distributing call pattern data for use in assessing a communications network, the communications network having a plurality of sites, each operable to transmit and/or receive calls, the apparatus comprising:
- (i) a receiver for receiving call data identifying number of calls to be made over the communications network, and a time period defining boundaries within which to make the calls;
- (ii) a receiver for receiving constraint data identifying a plurality of call constraint criteria including receiving and sending capabilities of the respective sites;
- (iii) a scheduler for scheduling the received call data in accordance with the received constraint data, thereby creating call pattern data defining instructions for each of a plurality of the sites to make a plurality of connections across the communications network to one or more other sites within the boundaries of the time period;
- (iv) an organizer for organizing the call pattern data into a plurality of sub-schedules, each of the sub-schedules corresponding to a different one of said sites; and
- (v) a distributor for distributing the sub-schedules to the respective sites to operate the sites in accordance with their respective sub-schedule.

20. An apparatus in claim 19, wherein:

the call constraint criteria comprises an indication of the type of call to be made, the types of call including simple chargeable and simple non-chargeable.

21. An apparatus as in claim 19, wherein the communications network is divided into a number of zones with the sites being distributed between different zones and wherein:

the call constraint criteria comprises an indication of the zone from which the calls are to be made.

22. An apparatus as in claim 19 further comprising a monitor for tracking aspects of said connection, and a generator for generating results indicative of the tracked aspects.

23. An apparatus as in claim 19, wherein:

the call constraint criteria comprises an indication of the rate at which calls are to be charged.

24. An apparatus as in claim 19, wherein:

the call constraint criteria comprises the requirement that the variation in the utilization of each site over the predetermined period is minimized.

25. An apparatus as in claim 19, wherein the scheduler further comprises a display for displaying the call constraint criteria.

26. A method as in claim 12, wherein the calls are randomly spread out over the course of the time period.

27. An apparatus as in claim 19, wherein the calls are randomly spread out of the course of the time period.

28. A method as in claim 12, wherein a start time for each call is randomly selected.

29. An apparatus as in claim 19, wherein a start time for each call is randomly selected.

30. A method as in claim 12, wherein the sub-schedules distributed to the respective sites allow the communications network to simulate real load conditions.

31. An apparatus as in claim 19, wherein the sub-schedules distributed to the respective sites allow the communications network to simulate real load conditions.

* * * * *